*(12)* United States Patent
Chen

*(10)* Patent No.: US 8,792,077 B2
*(45)* Date of Patent: Jul. 29, 2014

(54) COLOR FILTER, MANUFACTURING METHOD THEREOF, AND LIQUID CRYSTAL PANEL WITH THE SAME

(75) Inventor: Hsiao-hsien Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 161 days.

(21) Appl. No.: 13/574,436

(22) PCT Filed: May 14, 2012

(86) PCT No.: PCT/CN2012/075430
§ 371 (c)(1),
(2), (4) Date: Jul. 20, 2012

(87) PCT Pub. No.: WO2013/155747
PCT Pub. Date: Oct. 24, 2013

(65) Prior Publication Data
US 2013/0271705 A1 Oct. 17, 2013

(30) Foreign Application Priority Data
Apr. 16, 2012 (CN) .......................... 2012 1 0109084

(51) Int. Cl.
*G02F 1/1339* (2006.01)
*G02F 1/1335* (2006.01)
*G02B 5/20* (2006.01)

(52) U.S. Cl.
CPC .... *G02F 1/133512* (2013.01); *G02F 1/133516* (2013.01); *G02B 5/206* (2013.01)
USPC .......................................... 349/156; 349/106

(58) Field of Classification Search
CPC .................................................. G02F 1/133514
USPC .................................... 349/106–108, 155, 156
See application file for complete search history.

(56) References Cited

U.S. PATENT DOCUMENTS

| | | | | |
|---|---|---|---|---|
| 6,281,960 | B1 * | 8/2001 | Kishimoto et al. | 349/156 |
| 2009/0103023 | A1 * | 4/2009 | Chen et al. | 349/106 |
| 2009/0147207 | A1 * | 6/2009 | Goto | 349/155 |

FOREIGN PATENT DOCUMENTS

| | | |
|---|---|---|
| CN | 101008733 | 8/2007 |
| CN | 101071185 | 11/2007 |

(Continued)

OTHER PUBLICATIONS

International Search Report mailed on Jan. 10, 2013 for corresponding International Application No. PCT/CN2012/075430.

(Continued)

*Primary Examiner* — Phu Vu
(74) *Attorney, Agent, or Firm* — Ostrolenk Faber LLP

(57) ABSTRACT

The present disclosure provides color filter and a manufacturing method thereof, and a liquid crystal panel with the color filter. The color filter includes a substrate, a black matrix formed on the substrate, a number of spacers integrally formed with the black matrix; and a color filter with a thickness thereof being less than that of the black matrix. Color ink is disposed in the black matrix and is hardened to form the color filter layer. The black matrix and the spacers are integrally formed and made of the black film, which simplifies the manufacturing process of the color filter. Additionally, since the color filter layer is formed by the ink jet printing method, the height of the color filter is unlimited, which allows the black matrix and the spacers to be made of conventional material, and improves the yield rate of the color filter.

5 Claims, 4 Drawing Sheets

(56) References Cited

FOREIGN PATENT DOCUMENTS

| | | |
|---|---|---|
| CN | 101303522 | 11/2008 |
| CN | 101710219 | 5/2010 |
| JP | 2005292270 | 10/2005 |
| JP | 2010014870 | 1/2010 |

OTHER PUBLICATIONS

Chinese Office Action dated Feb. 21, 2014 issued in corresponding Chinese Application No. 201210109084 (Untranslated).

* cited by examiner

COLOR FILTER, MANUFACTURING METHOD THEREOF, AND LIQUID CRYSTAL PANEL WITH THE SAME

CROSS REFERENCE TO RELATED APPLICATIONS

The present application is a 35 U.S.C. §371 National Phase conversion of PCT/CN2012/075430, filed May 14, 2012, which claims benefit of Chinese Application No. 201210109084.3, filed Apr. 16, 2012, the disclosures of which are incorporated herein by reference.

BACKGROUND

1. Technical Field

The present disclosure relates to liquid crystal displaying technologies and, particularly, to a color filter and a manufacturing method thereof, and a liquid crystal panel with the color filter.

2. Description of Related Art

A liquid crystal display (LCD) is a flat panel display (FPD) that uses the characteristics of liquid crystal to display image. Compared to other types of display, LCD is thin and it requires lower driving voltage and lower power consumption, which makes it the mainstream product in the consumer goods market. The liquid crystal panel includes a color filter and a film transistor (TFT) array substrate bonded to the color filter. A number of spacers are provided between the color filter and the TFT array substrate for supplying spaces in which the liquid crystal are filled. The spacers are often disposed on the color filter.

Referring to FIG. 1, generally, the color filter includes a substrate 101, a black matrix 102, a color filter layer 103, a common electrode 104, and a number of spacers 105. The black matrix 102, the color filter layer 103, the common electrode 104, and the spacers 105 are all disposed on the substrate 101. The manufacturing method of the color filter often includes the following steps: firstly, coating a black film on the substrate 101, exposing and developing the black film to form the black matrix 102 and the spacers 105 integrally formed with the black matrix 102; secondly, coating a color resistance film on the substrate 101, exposing and developing the color resistance film to form the color filter layer 103 in between the black matrix 102; thirdly, forming the common electrode 104 on the color filter layer 103. The black matrix 102 and the spacers 105 are simultaneously formed in the manufacturing method, which simplifies the process of the color filter and reduces the cost thereof.

The thickness of the liquid crystal layer may range from 3 um to 4 um for ensuring the displaying effect of the liquid crystal display. That is, the space between two substrates of the liquid crystal panel, namely, the difference between the total height of the color filter 103 and the common electrode 104, and the total height of the black matrix 102 and the spacer 105, should reach 3 um to 4 um. Since the color resistance film forming the color filter layer 103 is coated on the black matrix 102 and the spacers 105, thus, the black matrix 102 is covered by the color filter layer 103 and the space between the two substrates of the liquid crystal panel is determined by the height of the spacer 105. However, because the black film is made of the conventional material, the height of the spacer 105 can only range from 0.2 um to 0.6 um by controlling the exposure degree in the exposure process of the black film. In this circumstance, in order to increase the space between the two substrates to meet the requirement, the black matrix 102 and the spacers 105 should be made of material of high light sensitivity. However, the thickness of the black film may be uneven due to the energy difference between manufacturing machines, which may increase the fraction defective of the color filter in the following manufacturing process thereof.

SUMMARY

One object of the present disclosure is to a color filter. The color filter includes a substrate, a black matrix formed on the substrate, a number of spacers integrally formed with the black matrix, and a color filter formed by an ink jet printing method with a thickness thereof being less than that of the black matrix.

Preferably, a number of color resistance regions are defined in the black matrix for allowing color ink of the color filter to be disposed therein.

Preferably, each of the spacers includes a first supporting portion formed on an upper surface of the black matrix and a second supporting portion formed on an upper surface of the first supporting portion.

Preferably, the black matrix defines a number of color resistance regions, and color ink of the color filter is disposed in the color resistance regions.

Preferably, the color filter engages with an array substrate to form a liquid crystal panel, the black matrix and the spacers are integrally formed from the black film formed on the substrate, a thickness of the black film is equal to the sum of the thickness of the color filter layer and space between the array substrate and the color filter.

Another object of the present disclosure is to provide a manufacturing method of a color filter. The method includes the following steps: disposing a black film on a substrate; exposing and developing the black film to form a black matrix and a number of spacers; and disposing color ink into the black matrix by an ink jet printing method, hardening the color ink to form a color filter layer with a thickness thereof being less than a thickness of the black matrix.

Preferably, the step of exposing and developing the black film to form a black matrix and a number of spacers includes: exposing the black film with ultra light rays passing through a mask having gray-tone areas, light transmission areas, and light shielding areas; and developing the exposed black film to form the black matrix and the spacers, defining a number of color resistance regions in the black matrix.

Preferably, the color ink includes red ink, green ink, and blue ink, and the step of disposing color ink into the black matrix by an ink jet printing method includes: disposing the red ink, green ink, and the blue ink to the respective color resistance region by the ink jet printing method.

Preferably, the step of exposing and developing the black film to form a black matrix and a number of spacers includes: exposing the black film with the ultra light rays passing through the mask having gray-tone areas, light transmission areas, and light shielding areas, each of the gray-tone areas includes two gray scales of different levels; and developing the exposed black film to form the black matrix and the spacers, defining a number of color resistance regions in the black matrix, and each of the spacers includes a first supporting portion and a second supporting portion.

Preferably, the color ink includes red ink, green ink, and blue ink, the step of disposing color ink into the black matrix by an ink jet printing method includes: disposing the red ink, the green ink, and the blue ink to the respective color resistance region by the ink jet printing method.

Preferably, the color ink includes red ink, green ink, and blue ink, the step of disposing color ink into the black matrix by an ink jet printing method includes: disposing the red ink, green ink, and the blue ink to the respective color resistance region by the ink jet printing method.

Preferably, the color filter engages with an array substrate to form a liquid crystal panel, the black matrix and the spacers are integrally formed and made of the black film coated on the substrate, a thickness of the black film is equal to the sum of the thickness of the color filter layer and space between the array substrate and the color filter.

Yet another object of the present disclosure is to provide a liquid crystal panel. The liquid crystal panel includes an array substrate with a number of pads disposed thereon and a color filter. The color filter includes a substrate, a black matrix formed on the substrate, a number of spacers respectively integrally formed with the black matrix and respectively abutting the pads, and a color filter layer formed by an ink jet printing method with a thickness thereof being less than that of the black matrix.

Preferably, the black matrix defines a number of color resistance regions for allowing color ink of the color filter layer to be disposed therein.

Preferably, the black matrix and the spacers are integrally formed from the black film coated on the substrate, and a thickness of the black film is equal to the sum of the thickness of the color filter layer and space between the array substrate and the color filter.

Preferably, each of the spacers includes a first supporting portion formed on an upper surface of the black matrix and a second supporting portion formed on an upper surface of the corresponding first supporting portion.

Preferably, an opening is formed in each of the pad for clamping the second supporting portion of the corresponding spacer therein.

Preferably, the black matrix and the spacers are integrally formed and made of the black film coated on the substrate, and a thickness of the black film is equal to the sum of the thickness of the color filter layer and space between the array substrate and the color filter.

The black matrix of the color filter of the present disclosure is integrally and simultaneously formed with the spacers, which simplifies the manufacturing process of the color filter. Since the color filter layer of the color filter is formed by the ink jet printing method, which allows the height of the black matrix to be unlimited somehow in the manufacturing process of the color filter layer. In this way, the difference between the thickness of the black film coated on the substrate and that of the color filter layer can be greater enough to satisfy the space required between the two substrates of the liquid crystal panel, and height of the black matrix or height of the spacers does not affect the space between the two substrates of the liquid crystal panel from being influenced by the black matrix and the spacers. Thus, the black matrix and the spacers can be made of conventional material for improving the yield rate of the color filter.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
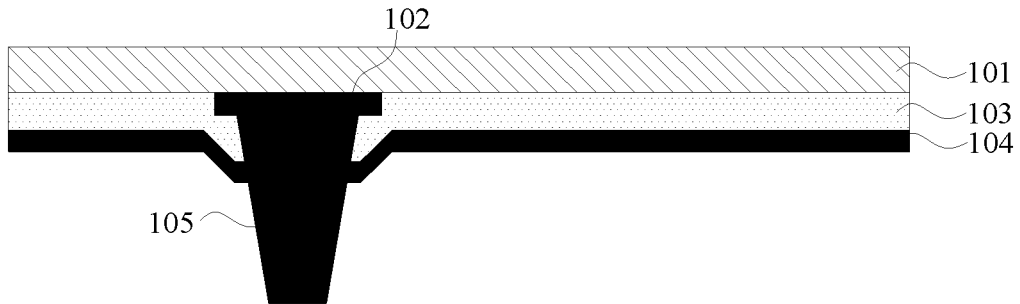
FIG. 1 is a schematic view of a conventional color filter.
Figure 2:
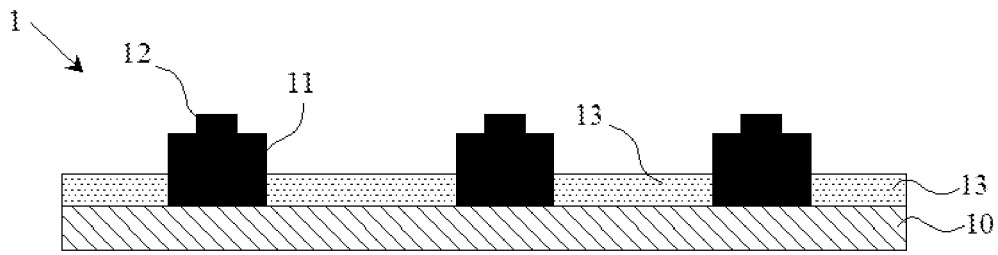
FIG. 2 is a schematic view of a color filter in accordance with a first embodiment of the present disclosure.

Referring to FIG. 2, a color filter 1, in accordance with a first embodiment of the present disclosure, is shown. The color filter 1 includes a substrate 10, a black matrix 11, a number of spacers 12, and a color filter layer 13. The black matrix 11 is disposed on the substrate 10 in the form of matrix. The black matrix 11 defines a number of color resistance regions. The spacers 12 are integrally formed with the black matrix 11 and are formed on an upper surface of the black matrix 11. The color filter layer 13 is formed by color ink disposed in the color resistance regions. For example, the color filter layer 13 includes a red filter layer, a blue filter layer, and a green filter layer, which are respectively formed by red ink, blue ink, and green ink. A thickness of the color filter layer 13 is less than that of the black matrix 11.

Figure 3:
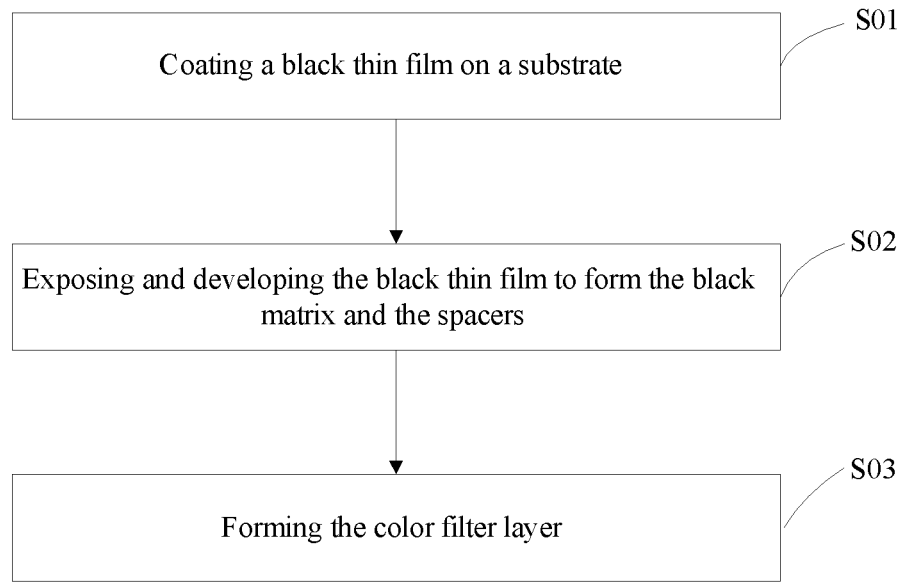
FIG. 3 is a flow chart of a manufacturing method of the color filter of FIG. 2.

Referring to FIG. 3, a manufacturing method of the color filter 1 is provided. The manufacturing method includes the following steps:

Step S01, coating a black film on a substrate 10.

Step S02, exposing and developing the black film to form the black matrix 11 and the spacers 12.

Figure 4:
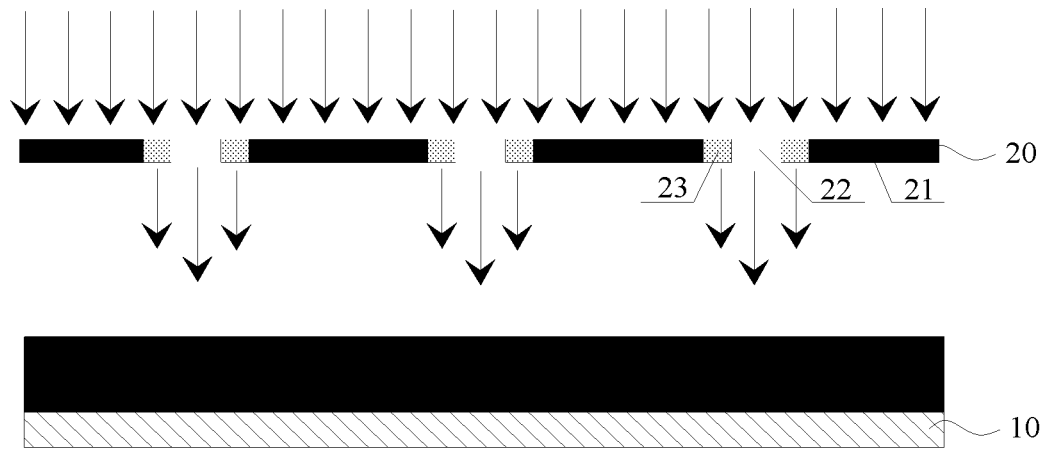
FIG. 4 is a schematic view illustrating an exposure process on a black film by a mask.
Figure 5:
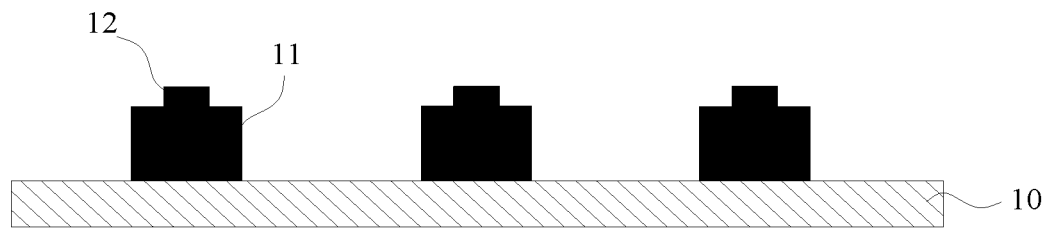
FIG. 5 is a schematic view of a black matrix and spacers after a developing process of the black film of FIG. 4.

As shown in FIG. 4, the black film is exposed by a mask 20. The mask 20 used in the exposure process includes a number of light shielding areas 21, a number of light transmission areas 22, and a number of gray-tone areas 23. Ultra light rays irradiate on the black film after passing through the mask 20. Since energies of the ultra light rays irradiating on the black film after passing through the mask 20 are different from each other, the thicknesses of different parts of the black film are different from each other after being developed. As shown in FIG. 5, after the exposure process and the developing process, the parts of the black film which are located under the light shielding areas 21 respectively are removed completely; the parts of the black film which are located under the light transmission areas 22 respectively are kept original, and the parts of the black film which are located under the gray-tone areas 23 respectively are partly removed. Thus, the black matrix 11 and the spacers 12 are formed. The black matrix 11 defines a number of the color resistance regions therein.

Step S03: forming the color filter layer 13.

Figure 6:
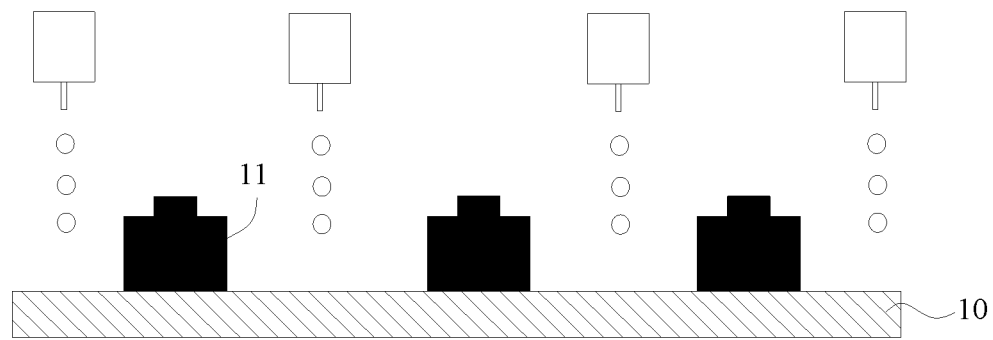
FIG. 6 is a schematic view illustrating the process of disposing color ink to color resistance regions.

Referring to FIG. 6, the color ink is disposed into the color resistance regions. The red ink, blue ink, and green ink are disposed into the corresponding color resistance region via an ink jet printing method. Each color resistance region is filled in the ink of the same color. The ink then is hardened to form the red filter layer, a blue filter layer, and a green filter layer, which form the color filter layer 13, as shown in FIG. 2. The thickness of the color filter layer 13 is less than that of the black matrix 11.

The black matrix 11 and the spacers 12 of the color filter 1 of the present disclosure are integrally and simultaneously formed, which simplifies the manufacturing process of the color filter 1. Since the color filter layer 13 of the color filter 1 is formed by the ink jet printing method, which allows the height of the black matrix 11 to be unlimited somehow in the manufacturing process of the color filter layer 13. In this way, the difference between the thickness of the black film coated on the substrate 10 and that of the color filter layer 13 can be greater enough to satisfy the space required between the two substrates of the liquid crystal panel, and height of the black matrix 11 or height of the spacers 12 does not affect the space between the two substrates of the liquid crystal panel. Thus, the black matrix 11 and the spacers 12 can be made of conventional material for improving the yield rate of the color filter 1.

Figure 7:
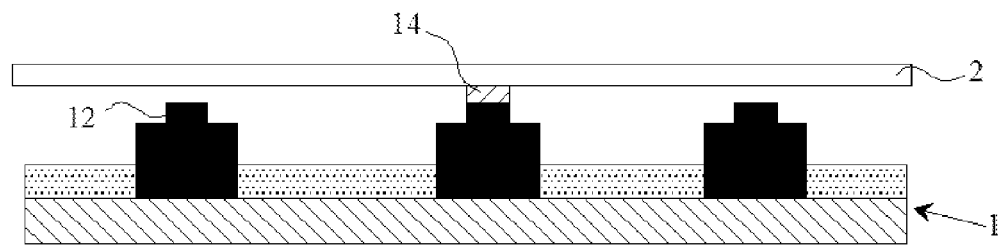
FIG. 7 is a schematic view of a liquid crystal panel with the color filter of FIG. 2.

Referring to FIG. 7, a liquid crystal panel with the color filter 1, is shown. The liquid crystal panel includes the above color filter 1 and an array substrate 2. A number of pads 14 are disposed on the array substrate 2 for respectively abutting the spacers 12 of the color filter 1. With the pads 14, the relative movement between the spacers 12 and the array substrate 2 can be limited.

Figure 8:
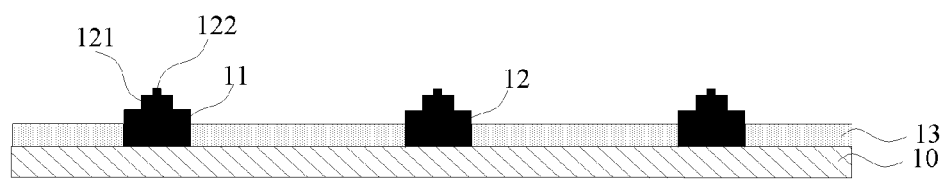
FIG. 8 is a schematic view of a color filter in accordance with a second embodiment of the present disclosure.

Referring to FIG. 8, a color filter, in accordance with a second embodiment, is shown. The difference between the color filter of the second embodiment and the color filter of the first embodiment lies in that, in this embodiment, each of the spacer 12 is step-profiled, and includes a first supporting portion 121 and a second supporting portion 122.

Figure 9:
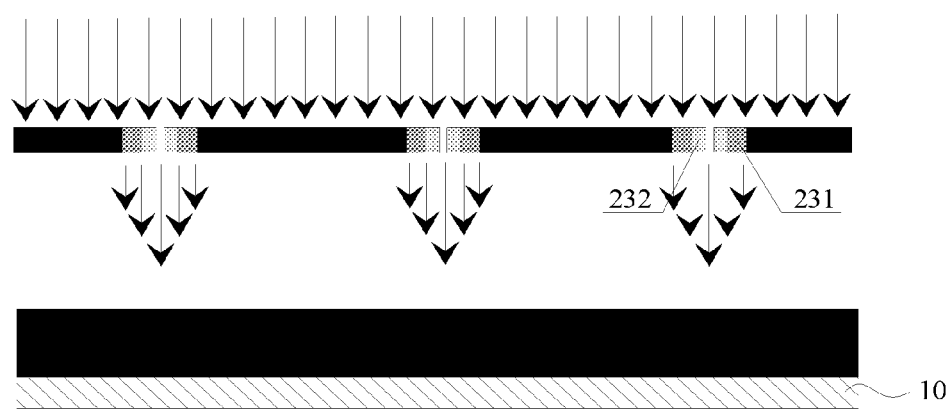
FIG. 9 is a schematic view illustrating an exposure process on a black film by a mask.
Figure 10:
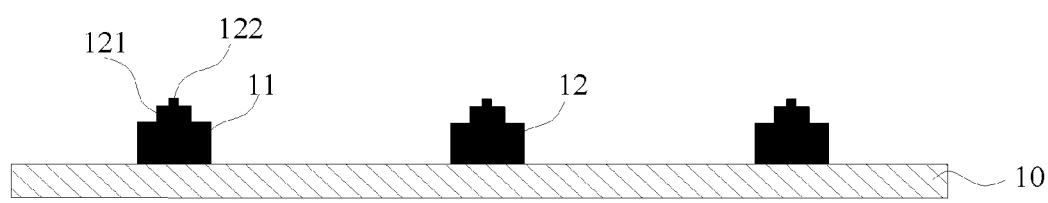
FIG. 10 is a schematic view of a black matrix and spacers after a developing process on the black film.

Referring to FIGS. 9 and 10, in which FIG. 9 is a schematic view illustrating an exposure process on a black film by a mask, and FIG. 10 is a schematic view of a black matrix and spacers after a developing process on the black film. The difference between the manufacturing method of the embodiment and that of the first embodiment lies in that, each of the gray-tone areas of the mask used in the exposure and developing process on the black film includes two gray scales 231, 232 of different levels. The black film is exposed and developed to form the black matrix 11 and the step-profiled spacers 12. As shown in FIG. 10, each of the spacers 12 includes a first supporting portion 121 and a second supporting portion 122.

The black matrix 11 of the color filter 1 of the present disclosure is integrally and simultaneously formed with the spacers 12, which simplifies the manufacturing process of the color filter 1. Since the color filter layer 13 of the color filter 1 is formed by the ink jet printing method, which allows the height of the black matrix 11 to be unlimited somehow in the manufacturing process of the color filter layer 13. In this way, the difference between the thickness of the black film coated on the substrate 10 and that of the color filter layer 13 can be greater enough to satisfy the space required between the two substrates of the liquid crystal panel, and height of the black matrix 11 or height of the spacers 12 does not affect the space between the two substrates of the liquid crystal panel. Thus, the black matrix 11 and the spacers 12 can be made of conventional material for improving the yield rate of the color filter 1.

Figure 11:
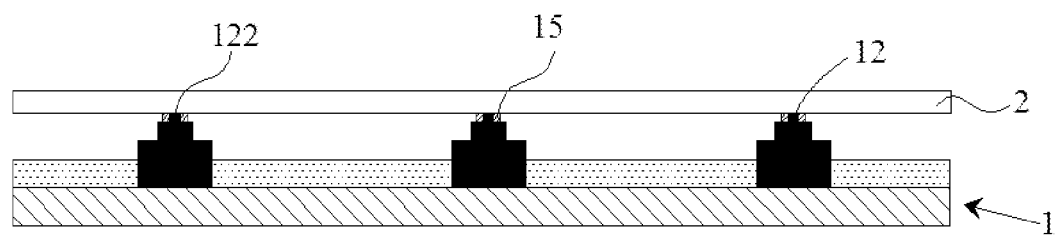
FIG. 11 is a schematic view of a liquid crystal panel with the color filter of FIG. 8.

Referring to FIG. 11, a liquid crystal panel with the color filter of the second embodiment is shown. The liquid crystal panel is provided with a number of pads 15 disposed on the array substrate 2. An opening is defined in the middle portion of each of the pads 15. When the spacers 12 of the color filter 1 respectively abut the pads 15, the second supporting portion 122 is received in the opening of the corresponding pad 15 for limiting the relative movement between the spacers 12 and the array substrate 2.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A manufacturing method of a color filter, comprising:
   disposing a black film on a substrate;
   exposing and developing the black film to form a black matrix and a plurality of spacers; and
   disposing color ink into the black matrix by an ink jet printing method, hardening the color ink to form a color filter layer with a thickness thereof being less than a thickness of the black matrix;
   wherein the step of exposing and developing the black film to form a black matrix and a plurality of spacers comprises:
   exposing the black film with the ultra light rays passing through the mask having gray-tone areas, light transmission areas, and light shielding areas, each of the gray-tone areas comprises two gray scales of different levels; and
   developing the exposed black film to form the black matrix and the spacers, defining a plurality of color resistance regions in the black matrix, and each of the spacers comprises a first supporting portion and a second supporting portion.

2. The manufacturing method as claimed in claim 1, wherein the color ink comprises red ink, green ink, and blue ink, the step of disposing color ink into the black matrix by an ink jet printing method comprises: disposing the red ink, the green ink, and the blue ink to the respective color resistance region by the ink jet printing method.

3. The manufacturing method as claimed in claim 1, wherein the color filter engages with an array substrate to form a liquid crystal panel, the black matrix and the spacers are integrally formed and made of the black film coated on the substrate, a thickness of the black film is equal to the sum of the thickness of the color filter layer and space between the array substrate and the color filter.

4. A manufacturing method of a color filter, comprising:
   disposing a black film on a substrate;
   exposing and developing the black film to form a black matrix and a plurality of spacers; and
   disposing color ink into the black matrix by an ink jet printing method, hardening the color ink to form a color filter layer with a thickness thereof being less than a thickness of the black matrix;
   wherein the color filter engages with an array substrate to form a liquid crystal panel, the black matrix and the spacers are integrally formed and made of the black film coated on the substrate, a thickness of the black film is equal to the sum of the thickness of the color filter layer and space between the array substrate and the color filter.

5. The manufacturing method as claimed in claim 4, wherein the color ink comprises red ink, green ink, and blue ink, the step of disposing color ink into the black matrix by an ink jet printing method comprises: disposing the red ink, the green ink, and the blue ink to the respective color resistance region by the ink jet printing method.

* * * * *